Figures 1, 2:
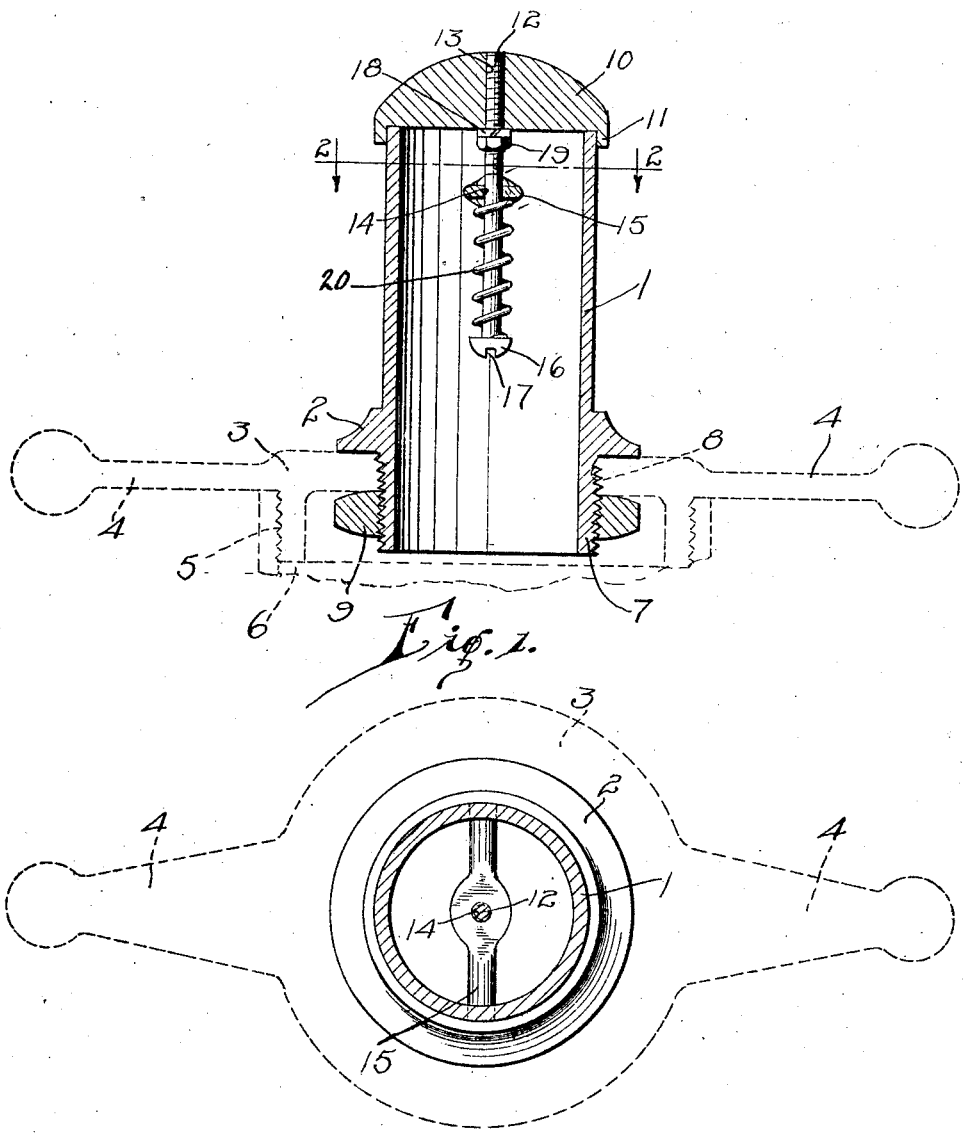

Nov. 3, 1925.

J. E. WOOD 1,560,457

SAFETY VALVE

Original Filed May 13, 1922

INVENTOR
J. E. Wood
BY
ATTORNEYS

Patented Nov. 3, 1925.

1,560,457

UNITED STATES PATENT OFFICE.

JOSEPH E. WOOD, OF CHICAGO, ILLINOIS, ASSIGNOR OF ONE-HALF TO FRED W. KEECH, OF CHICAGO, ILLINOIS, AND ONE-HALF TO RELIABLE SAFETY VALVE CO., OF CHICAGO, ILLINOIS, A CORPORATION OF ILLINOIS.

SAFETY VALVE.

Application filed May 13, 1922, Serial No. 560,590. Renewed May 4, 1925.

*To all whom it may concern:*

Be it known that I, JOSEPH E. WOOD, a citizen of the United States, and a resident of Chicago, in the county of Cook and State of Illinois, have invented a new and useful Improvement in Safety Valves, of which the following is a full, clear, and exact description.

My invention relates to improvements in safety valves, and it consists in the combinations, constructions, and arrangements herein described and claimed.

An object of my invention is to provide a safety valve which may be readily attached to gasoline tanks or the like.

A further object of my invention is to provide a device of the character described which is adapted to automatically keep the pressure within a gasoline tank at a predetermined point.

A further object of my invention is to provide a device of the character described which is simple in construction, and which is efficient and durable for the purpose intended.

Other objects and advantages will appear in the following specification, and the novel features of the invention will be particularly pointed out in the appended claim.

My invention is illustrated in the accompanying drawings forming part of this application, in which Figure 1 is a vertical section through the device, as shown operatively applied to the cover cap of a tank, and Figure 2 is a section along the line 2—2 of Figure 1.

In carrying out my invention I provide a cylindrical member 1 which has an integral annular flange 2 of the shape shown in Figure 1. The flange 2 is adapted to abut the top of a cover 3 of an inlet opening. The cover or cap 3 is of ordinary construction and has actuating handles 4 and a threaded portion 5 which is adapted to enter the inlet opening 6 of the tank. The member 1 has a threaded tubular shank 7 which depends below the shoulder 2 and is disposed in an opening 8 in the cap 3. A locking nut 9 is screwed onto the portion 7 and rigidly secures the member 1 to the cap 3. In this manner the device is locked in place and is ready for use. It will be observed that the member 1 is in direct communication with the contents of the tank and that therefore the pressure within the member 1 will always be the same as the pressure within the tank.

The top of the member 1 is open and is provided with a cover 10. The cover 10 has a spherical upper surface and has a flange 11 which is adapted to enclose the upper portion of the cylinder 1. The cover when in closed position forms an effective seal for the member 1 and prevents dust and dirt from entering the tank. The cover is yieldingly held in place by means of a guide rod 12 which has a threaded portion that is screwed into a threaded central bore 13 of the cover. The rod 13 terminates adjacent to the top of the cover and thus provides a continuous surface therewith. The rod 12 is slidably disposed in an opening 14 of a cross bar 15. As clearly shown in Figure 2, the cross bar 15 is cylindrical at its ends and is flattened at its mid portion so as to provide a substantial support to the rod 12. The rod has a head 16 at the lower end thereof which has a kerf 17 therein by means of which the rod is adapted to be screwed into the cover 10. The rod is further locked in place to the cover 10 by means of a spring locking washer 18 and a lock nut 19 which abut the under side of the cover 10. A spring 20 is disposed between the head 16 and the bar 15 and yieldingly holds the cover 10 in closed position.

From the foregoing description of the various parts of the device, the operation thereof may be readily understood. As heretofore stated, the device may be readily secured to a gasoline tank, or the like, of ordinary construction. The cover 10 is adjusted so as to automatically open when the pressure within the tank exceeds a predetermined pressure by rotating the rod 12 so as to tighten or loosen the spring and filing off the portion of the rod which projects above the top of the cover. In this manner, the cover may be adjusted so as to automatically open at any predetermined pressure.

It is a well known that in gasoline tanks the pressure therein gets rather high during hot weather. This is the cause of numerous explosions which cause more or less damage, with my present device, however, any increase in pressure within the tank will automatically move the cover 10 outwardly against the tension of the spring 20, thus causing any excess gas to pass into the atmosphere. As soon as the pressure within the tank reaches its normal point, the spring 20 automatically seats the cover 10 with respect to the member 1 and thus closes the opening. The flange 2 and the cover 10 are fashioned so as to make a pleasing appearance to the eye, and in addition allow the water to quickly drain off in case of rain. As heretofore stated, the device may be adjusted so as to function at any predetermined pressure which is within the tank. The device is simple in construction, and is efficient and durable for the purpose intended. It is not likely to easily get out of order and provides an effective means for keeping the pressure within the gasoline tank, or the like, constant.

I claim:

A safety valve for tanks comprising a cylindrical member having a threaded end, a flange disposed adjacent to the threaded portion, a nut adapted to lock said cylinder to a cover, a cap adapted to close the upper end of said cylinder and having a threaded bore therein, said cap being provided with a guiding flange that is adapted to receive the end of said cylinder, a bar extending transversely across said cylinder, and having an opening therein, a screw slidably disposed in said opening and having its threaded end received in said threaded bore in said cap, means for locking said screw to said cap, and a spring mounted on said screw and being disposed between said bar and the head of said screw.

JOSEPH E. WOOD.